(12) United States Patent
Christenson et al.

(10) Patent No.: US 7,156,122 B2
(45) Date of Patent: Jan. 2, 2007

(54) ROTARY BALL VALVE ASSEMBLY

(75) Inventors: Cynthia Christenson, Trabuco Canyon, CA (US); Jamee Mohrfeld, Houston, TX (US); Kevin Jackson, Highnam (GB)

(73) Assignee: Mogas Industries, Inc., Houston, TX (US)

( * ) Notice: Subject to any disclaimer, the term of this patent is extended or adjusted under 35 U.S.C. 154(b) by 0 days.

(21) Appl. No.: 11/111,708

(22) Filed: Apr. 22, 2005

(65) Prior Publication Data

US 2006/0237071 A1 Oct. 26, 2006

(51) Int. Cl.
F16K 47/04 (2006.01)

(52) U.S. Cl. ............................ 137/625.32; 29/890.124; 251/127

(58) Field of Classification Search ............. 137/625.3, 137/625.31, 625.32; 251/121, 127; 138/43; 29/890.124
See application file for complete search history.

(56) References Cited

U.S. PATENT DOCUMENTS

| | | | |
|---|---|---|---|
| 3,419,045 A | 12/1968 | King, Jr. | |
| 3,630,229 A * | 12/1971 | Nagel et al. | 137/625.3 |
| 4,889,163 A * | 12/1989 | Engelbertsson | 137/625.32 |
| 5,180,139 A | 1/1993 | Gethmann | |
| 5,193,583 A | 3/1993 | Gethmann | |
| 5,218,984 A * | 6/1993 | Allen | 137/1 |
| 5,287,889 A | 2/1994 | Leinen | |
| 5,332,004 A | 7/1994 | Gethmann | |
| 5,509,446 A * | 4/1996 | Bey | 137/625.32 |
| 5,511,584 A | 4/1996 | Leinen | |
| 5,680,889 A * | 10/1997 | Boger | 137/625.32 |
| 5,758,689 A | 6/1998 | Leinen | |
| 5,771,929 A | 6/1998 | Boger | |
| 5,799,695 A | 9/1998 | Bey | |
| 5,937,901 A * | 8/1999 | Bey | 137/625.32 |
| 6,868,865 B1 | 3/2005 | Tran | |
| 6,886,596 B1 | 5/2005 | Tran | |
| 6,913,042 B1 | 7/2005 | Tran | |
| 6,923,210 B1 | 8/2005 | Tran | |
| 7,011,109 B1 | 3/2006 | Tran | |
| 7,044,436 B1 * | 5/2006 | Corbetta et al. | 251/127 |
| 2004/0020541 A1 | 2/2004 | Tran et al. | |

FOREIGN PATENT DOCUMENTS

GB 2309063 7/1997

* cited by examiner

Primary Examiner—John Fox
(74) Attorney, Agent, or Firm—Daniel N. Lundeen; Lundeen & Dickinson, LLP

(57) ABSTRACT

A method of forming a ball valve element for a rotary ball valve assembly, the method comprising the steps of: (a) inserting an impedance element through an insertion opening of a ball valve element into a bore; (b) forming a fluid opening in the ball valve element which is non-rectilinearly aligned with the insertion opening and which communicates with the bore; and (c) sealing the insertion opening. A ball valve element for a rotary ball valve assembly formed using such a method; and a rotary ball valve assembly comprising a ball valve element formed using such a method are also provided.

17 Claims, 8 Drawing Sheets

ROTARY BALL VALVE ASSEMBLY

BACKGROUND OF THE INVENTION

This invention relates to a ball valve element for a rotary ball valve assembly, and more particularly to a method of forming such a ball valve element.

Rotary valve assemblies are well known, such as described in WO03/087643 and shown in FIG. 1, and generally comprise a spherical or substantially spherical ball valve element 1 having a fluid-flow bore or conduit 2 therethrough. To provide pressure control of, and energy dissipation from, liquid flowing through the ball valve element, an impedance element 3 is commonly provided in the bore or conduit. The impedance element defines a typically tortuous path along which the fluid can flow, resulting in the desired pressure change.

The impedance element can be a separate device which is located in the bore or conduit of the ball valve element. However, an opening 4 to the bore or conduit, leading to the impedance element, then has to be provided either integrally formed as part of the ball valve element or as a further separate element. In either case, an external surface 5 of the ball valve element which defines the opening 4 to the impedance element must be accurately machined to match the internal dimensions, and specifically the internal radial dimensions, of a housing 6 of the rotary ball valve assembly in which the ball valve element will be rotatably located.

In the case when the impedance assembly itself partly defines an exterior surface 7 of the ball valve element, again this part of the impedance assembly must be accurately formed to fit the internal dimensions of the ball valve housing.

Accurately post-forming part of an exterior surface of a ball valve element, so that the exterior surface corresponds to the internal dimensions of the ball valve housing, is problematic and time consuming.

The present invention seeks to provide a solution to this problem.

SUMMARY OF THE INVENTION

According to a first aspect of the present invention, there is provided a method of forming a ball valve element for a rotary ball valve assembly, the method comprising the steps of: (a) inserting an impedance element through an insertion opening of a ball valve element into a bore; (b) forming a fluid opening in the ball valve element which is non-rectilinearly aligned with the insertion opening and which communicates with the bore; and (c) sealing the insertion opening.

According to a second aspect of the invention, there is provided a ball valve element for a rotary ball valve assembly formed using a method in accordance with the first aspect of the invention.

According to a third aspect of the invention, there is provided a rotary ball valve assembly comprising a ball valve element formed using a method in accordance with the first aspect of the invention.

The invention will now be more particularly described, by way of example only, with reference to the accompanying drawings.

DESCRIPTION OF THE PREFERRED EMBODIMENTS

Figure 1:
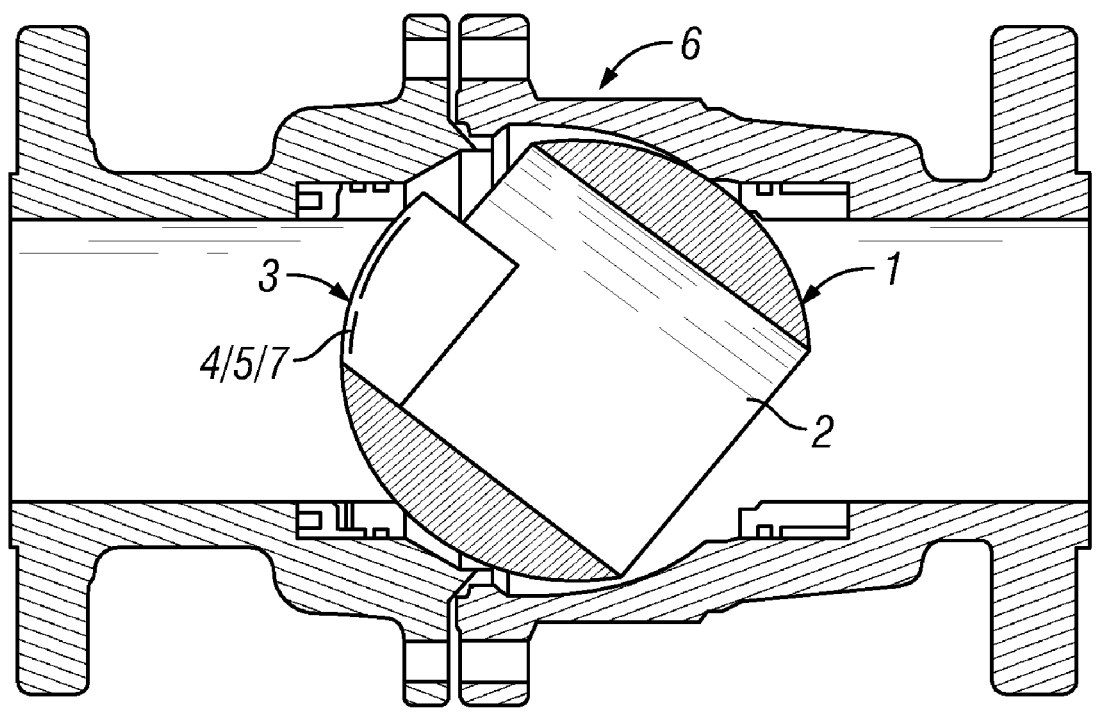
FIG. 1 is a cross-sectional plan view of a prior art arrangement of a rotary ball valve.
Figure 2:
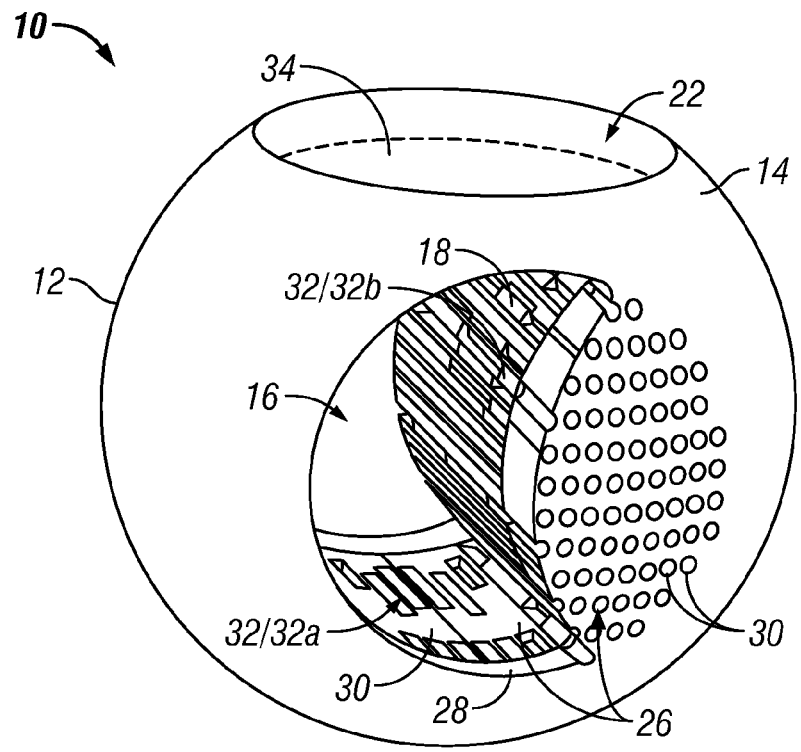
FIG. 2 is a perspective view of a first embodiment of a ball valve element, in accordance with the second aspect of the invention and formed in accordance with the first aspect of the present invention.
Figure 3:
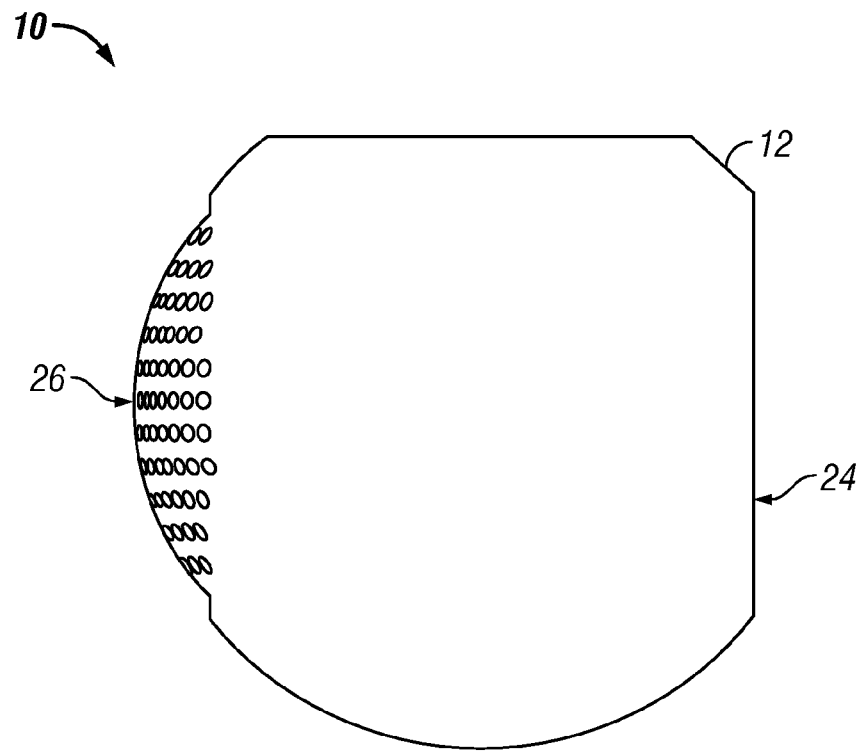
FIG. 3 is a side view of the ball valve element shown in FIG. 2.

Referring firstly to FIGS. 2 to 4d, there is shown a ball valve element 10 which comprises a valve body 12 having at least a partly spherical exterior surface 14, a fluid-flow passage 16 which passes through the valve body 12, and an impedance element 18 which is provided in the fluid-flow passage 16.

The ball valve element 10 is formed by first selecting a standard or traditional valve body having a non-rectilinear through-bore 20. See FIG. 4a. In this case, the bore 20 of the standard valve body 12 deviates through 90 degrees from a first pre-existing or pre-formed opening 22 in a wall of the valve body 12 to a second pre-existing or pre-formed opening 24.

A suitably dimensioned impedance element 18 is inserted through the first existing opening 22 of the bore 20 of the valve body 12. See FIG. 4b. In this case, the impedance element 18 is dimensioned to extend fully across the lateral extent of the first opening 22, and beyond the lateral extent of the second opening 24. Since the bore 20, in this embodiment, has a circular lateral cross-section, the impedance element 18 has an outside diameter which provides a close or tolerance fit in the bore 20. See FIG. 4c.

Once it has been determined where the impedance element 18 lies in the bore 20 of the standard valve body 12, a third fluid opening 26 is formed through a wall 28 of the valve body 12 to communicate with the original bore 20. See FIG. 4b. This third opening 26 is spaced from the first opening 22 of the bore 20, and is non-rectilinearly aligned with the first opening 22. The third opening 26 is defined by a plurality of apertures 30 which generally correspond to multiple conduits 32 formed in the impedance element 18. In this embodiment, the impedance element 18 is provided with a main rectilinear conduit 32a which passes through the impedance element 18, and a plurality of secondary tortuous conduits 32b adjacent to the main rectilinear conduit 32a. The provision of main and secondary conduits 32a and 32b in an impedance element 18 is well known, and thus will not be described in any further detail. As a consequence, one of the apertures 30 formed in the wall 28 of the valve body 12 corresponds in position, shape and size to the main conduit 32a of the impedance element 18, and the remaining apertures 30 generally correspond in position to the secondary conduits 32b of the impedance element 18. See FIGS. 2 and 4d. The apertures 30 can thus be circular and/or non-circular.

Once the third fluid opening 26 is formed through the wall 28 of the valve body 12, the first opening 22 of the bore 20 is fluid-tightly capped or sealed (referenced as 34) to prevent liquid flowing into or out of the first opening 22. As a result, new fluid-flow passage 16 is provided through the valve body 12 which extends from the original second opening 24 to the newly formed third opening 26.

In this embodiment, the second and third openings 24 and 26 are rectilinearly aligned. However, the second and third openings 24 and 26 can be non-rectilinearly aligned.

As a result of forming the third fluid opening 26 in the spherical part of the wall of the valve body 12, the requirement of radiusing an exterior surface at the opening of the bore adjacent to the impedance element to match the spherical outer surface of the valve body, for example through machining or grinding part of an impedance element, a separate part to connect to the valve body and abut the impedance element, or an integral part of the valve body itself, is dispensed with.

Figure 4A:
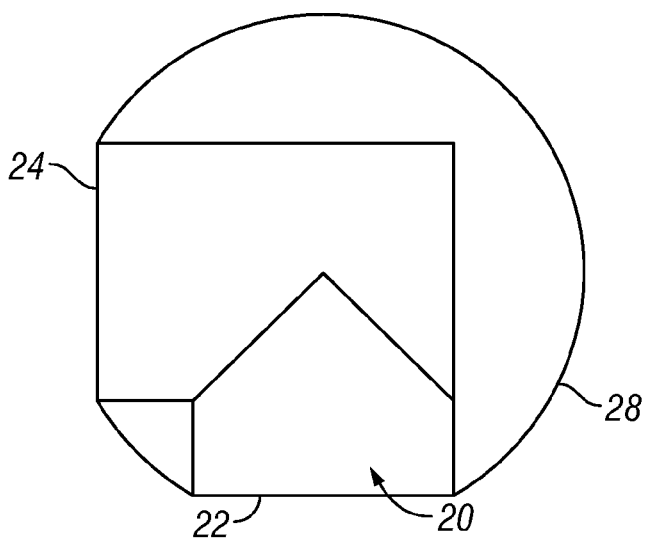
FIGS. 4a to 4d show, diagrammatically, a method of forming the ball valve element.
Figure 4B:
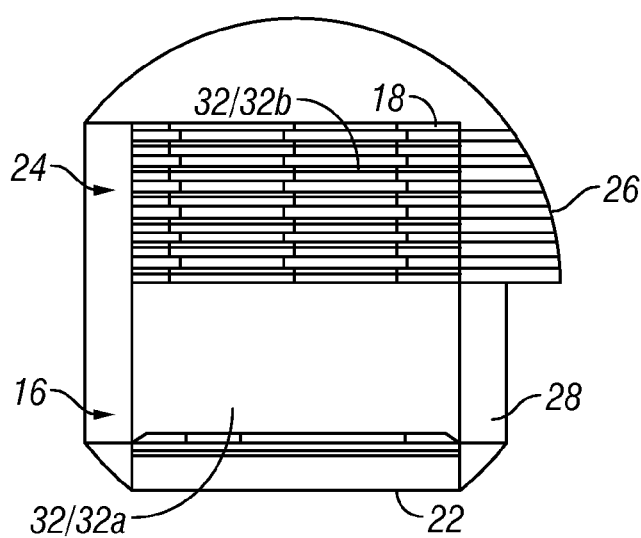
Figure 4C:
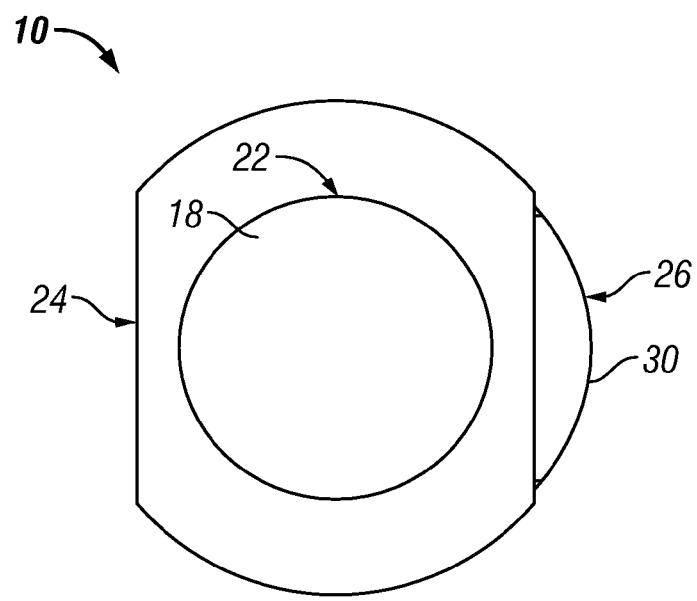
Figure 4D:
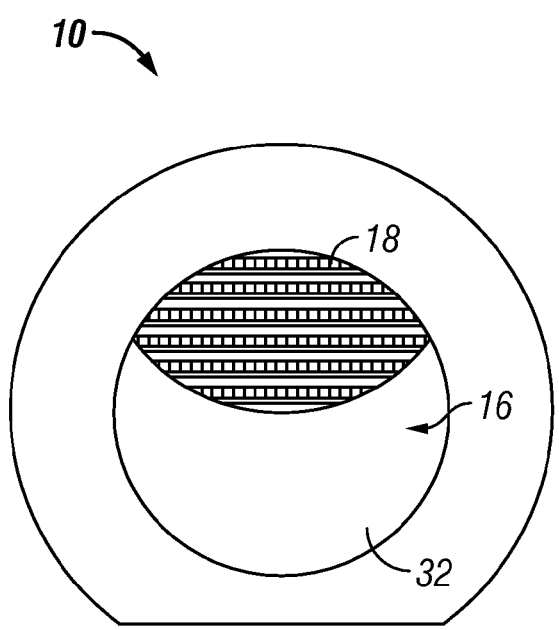
Figure 5:
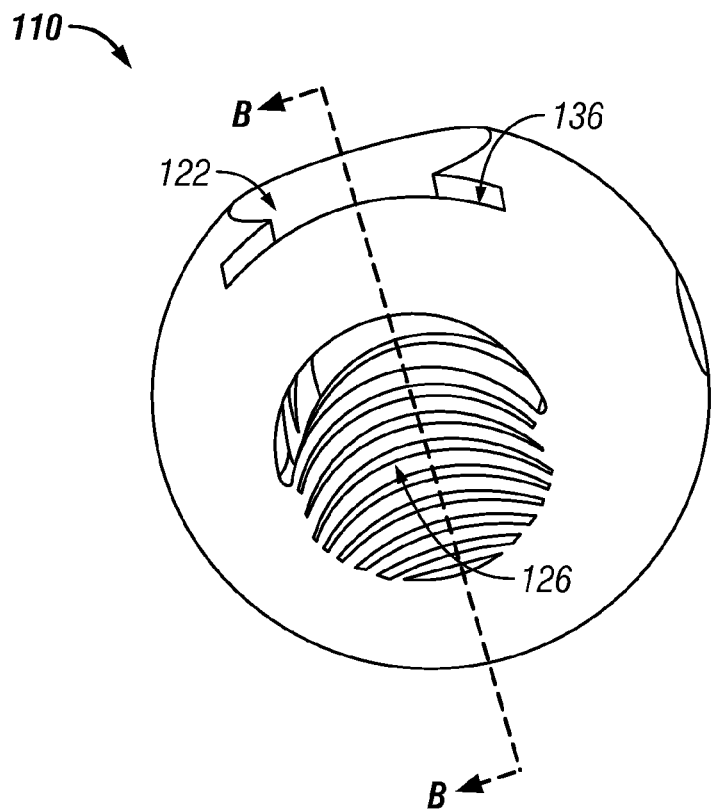
FIG. 5 is a perspective view of a second embodiment of a ball valve element, in accordance with the second aspect of the invention and formed in accordance with the first aspect of the invention.
Figure 6:
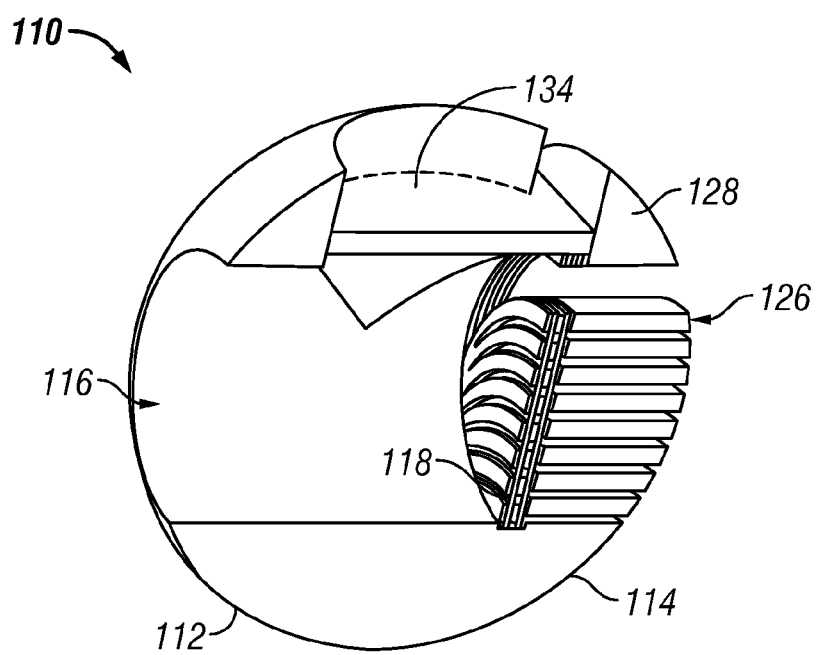
FIG. 6 shows a cross-section of the ball valve element of FIG. 5, taken along line B—B.
Figure 7A:
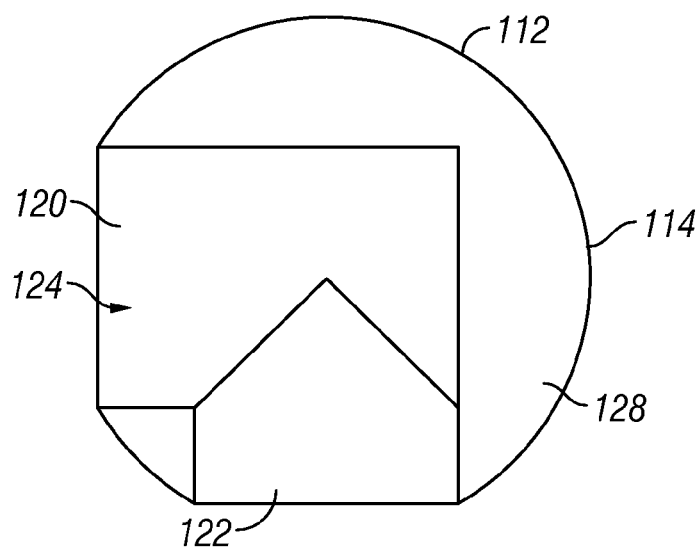
FIGS. 7a to 7e show, diagrammatically, the method of forming the ball valve element of the second embodiment.
Figure 7B:
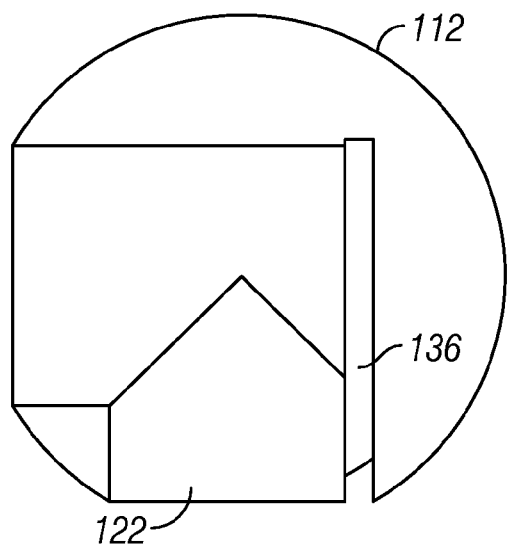
Figure 7C:
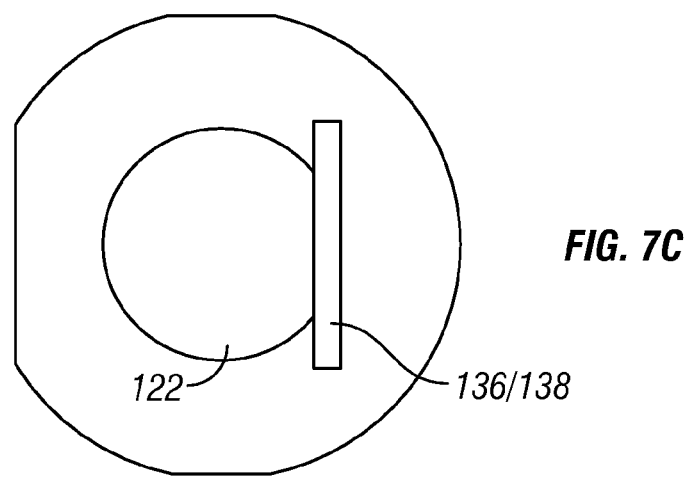
Figure 7D:
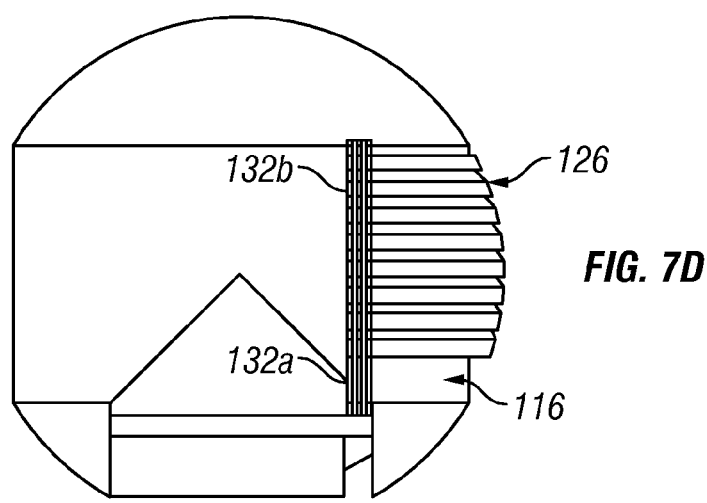
Figure 7E:
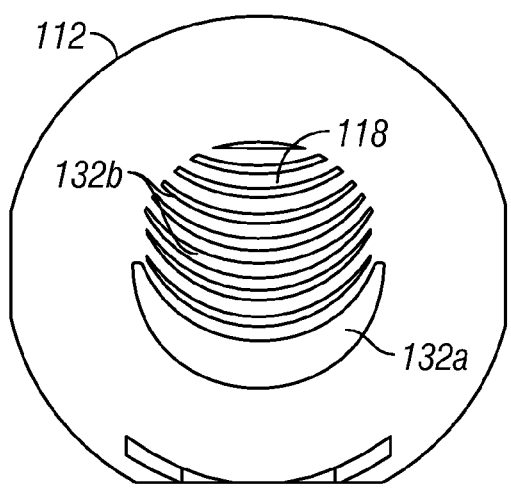

As will be understood from FIG. 4d, the impedance element 18 only partially occludes or obstructs the newly formed fluid-flow passage 16, due to the provision of the main rectilinear conduit 32a. However, an impedance element 18 which consists of only secondary tortuous conduits 32b, and which thus fully occludes or obstructs the fluid-flow passage 16, can be used.

Referring now to FIGS. 5 to 7e, there is shown a second embodiment of a ball valve element 110. Similar references refer to parts which are similar to those of the first embodiment, and thus further detailed description is omitted.

This ball valve element 110 again comprises a valve body 112 having a partly spherical exterior surface 114, a fluid-flow passage 116 which passes through the valve body 112, and an impedance element 118 which is provided in the fluid-flow passage 116. However, the impedance element 118 is plate shaped.

This ball valve element 110 is formed in a substantially similar manner to that described in the first embodiment. A standard ball valve element 110 having a non-rectilinear through-bore 120 with first and second pre-existing openings 122 and 124 is first selected. See FIG. 7a.

A slot 136 is formed in the first existing opening 122 of the through-bore 120 at one side thereof. The slot 136 extends partway along the through-bore 120 and, in this case, extends into the internal corner of the non-rectilinear through-bore 120. See FIG. 7b. The slot 136 runs in parallel with the longitudinal axis of the through-bore 120 on which the first opening 122 lies, and presents an exterior opening 138 having a length which is greater than a diameter of the through-bore 120. See FIG. 7c.

The plate-shaped impedance element 118 is dimensioned to be a tolerance or close sliding fit in the slot 136. See FIG. 7d. The plate-shaped impedance element 118 only extends partway across the lateral extent of the part of the through-bore 120 leading from the first opening 122. However, similarly to the first embodiment, the plate-shaped impedance element 118 extends beyond the lateral extent of the part of the through-bore 120 leading from the second existing opening 124.

A third fluid opening 126 is then, similarly to the first embodiment, formed in a wall 128 of the valve body 112 to correspond with main and secondary conduits 132a and 132b of the plate-shaped impedance element 118. See FIGS. 6, 7d and 7e. The third fluid opening 126 is spaced from the first existing opening 122 and non-rectilinearly aligned with the first opening 122. In this embodiment, the third opening 126 is rectilinearly aligned with the second existing opening 124, but may be non-rectilinearly aligned with the second opening 124.

Once the third fluid opening 126 is formed through the wall 128 of the valve body 112, the first existing opening 122 of the bore 120 and slot 136 are fluid-tightly capped or sealed 134 to prevent liquid flowing into or out of the first opening 122 and slot 136. As a result, a new fluid-flow passage 16 is provided through the valve body 112 which extends from the second existing opening 124 to the newly formed third fluid opening 126.

Figure 8:
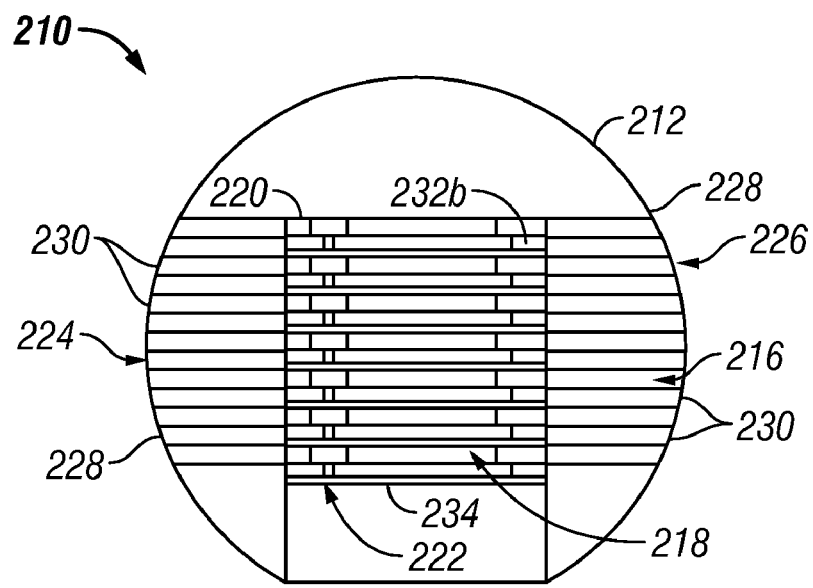
FIG. 8 shows, diagrammatically, a third embodiment of a ball valve element, in accordance with the second aspect of the invention and formed in accordance with the first aspect of the invention.

Referring to FIG. 8, there is shown a third embodiment of a ball valve element 210. Again, similar references refer to parts which are similar to those of the first and second embodiments, and further detailed description is omitted.

This ball valve element 210 is formed from a standard valve body 212 having a closed-bore 220, instead of a through-bore. As a result, the closed-bore 220 only has a first pre-existing or pre-formed opening 222. An impedance element 218 is dimensioned to fit the closed-bore 220 as a close or interference fit, similarly to the first embodiment. However, a slot along opposite sides of the closed-bore could be provided, similarly to the second embodiment, and two plate-shaped impedance elements could be inserted to lie in spaced parallel relationship.

Once the or each impedance element 218 is located in the closed-bore 220, second and third fluid opening 224 and 226 are formed in opposite walls 228 of the valve body 212. The second and third fluid openings 224, 226 are spaced and non-rectilinearly aligned with the first existing opening 222. The second and third fluid openings 224, 226 are rectilinearly aligned with each other, but may be non-rectilinearly aligned if necessity dictates.

The second and third fluid openings 224 and 226 both open out into, and thus fluidly communicate with, the existing closed-bore 220 leading from the first existing opening 222. The first opening 222 is then capped or sealed 234 as described above, resulting in a new fluid-flow passage 216 being formed through the valve body 212.

Although FIG. 8 shows the newly formed second and third fluid openings 224 and 226 being defined by a plurality of apertures 230 corresponding with only secondary tortuous conduits 232b of the single impedance element 218, obviously other arrangements or combinations of arrangements to define the second and third fluid openings 224, 226 are possible depending on the configuration of the or each impedance element 218 utilised.

Figure 9:
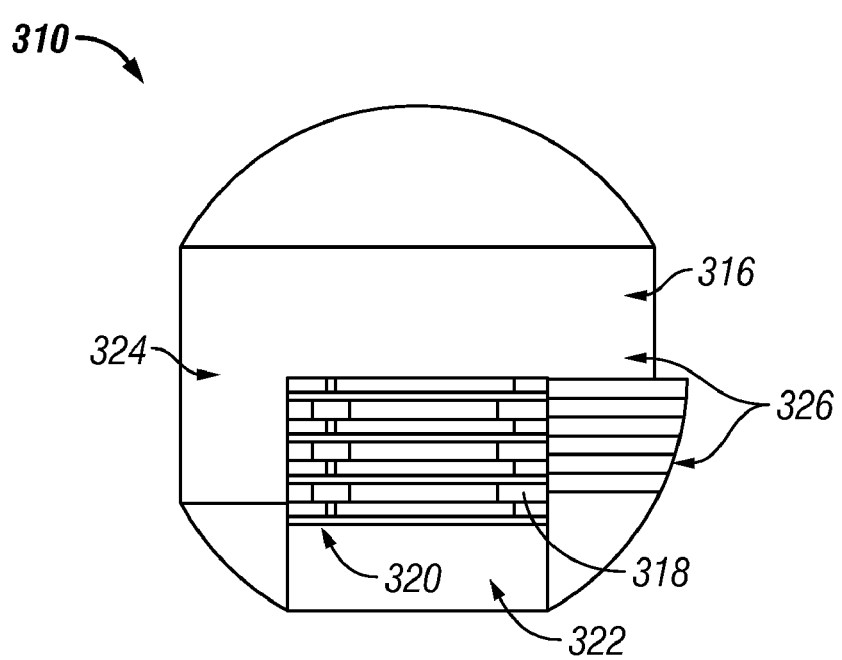
FIG. 9 shows, diagrammatically, a fourth embodiment of a ball valve element, in accordance with the second aspect of the invention and formed in accordance with the first aspect of the invention.

FIG. 9 shows a fourth embodiment of a ball valve element 310. Similar references refer to parts which are similar to those of the first and second embodiments, and further detailed description is omitted.

This ball valve element 310 is formed in a similar manner as described above. In this case, however, although an impedance element 318 extends fully across a lateral extent of part of an existing bore 320 leading from a first existing opening 322, the impedance element 318 is only located partway along the part of the existing bore 320 leading from the first opening 322. In other words, the impedance element 318 does not extend fully across a lateral extent of a fluid-flow passage 316 leading from an existing or newly formed second opening 324 to a newly formed third fluid opening 326.

In a modification to the fourth embodiment, if the impedance element is plate-shaped, then a corresponding slot does not extend to an internal corner of the existing bore.

Although the through-bore and the fluid-flow passage have or substantially have a circular lateral cross-section, a non-circular lateral cross-section can also be used.

The impedance element described above is formed in any suitable manner, and can be formed from a plurality of plates stacked in an in use vertical direction or a horizontal direction. When stacked horizontally, the plates can be stacked in a direction which extends across the through-bore, or which extends along a longitudinal axis of the through-bore.

The or each impedance element is fixed in the valve body before capping or sealing the first opening in any suitable manner, for example by welding or by screw-threaded fasteners.

A cap or seal used to block the existing first opening may or may not conform to the exterior radius of the valve body.

Furthermore, the existing first opening can be provided in any portion of the standard valve body. In other words, the existing first opening can be in a top, side or bottom of the standard valve body.

The standard valve body may have no existing openings or bores. In this case, an insertion opening and bore are first or pre-formed to enable insertion of the impedance element. As such, the insertion opening and the bore then becomes the existing opening and existing bore mentioned above.

In the case when the standard valve body does have an already existing pre-formed closed bore, an insertion opening and new bore which communicates with the existing bore may be formed to enable insertion of the impedance element into the existing bore.

Although the or each new fluid opening can be formed in the valve body after the or each impedance element has been inserted, the or each new fluid opening can be formed before the or each impedance element has been finally located in the valve body.

It is thus possible to provide a simplified method of forming a ball valve element for a rotary ball valve assembly. It is also possible to dispense with the requirements of machining and grinding a part defining an opening adjacent to an inserted impedance element.

The embodiments described above are given by way of examples only, and modifications will be apparent to persons skilled in the art without departing from the scope of the invention as defined by the appended claims.

What is claimed is:

1. A method of forming a ball valve element for a rotary ball valve assembly, the method comprising the steps of:
   a) inserting an impedance element through an insertion opening of a ball valve element into a bore;
   b) forming a fluid opening in the ball valve element which is non-rectilinearly aligned with the insertion opening and which communicates with the bore; and
   c) sealing the insertion opening.

2. A method as claimed in claim 1, wherein the fluid opening is defined by a plurality of first apertures.

3. A method as claimed in claim 2, wherein the first apertures are circular and/or non-circular.

4. A method as claimed in claim 1, wherein, in step (a), the insertion opening is formed in the ball valve element.

5. A method as claimed in claim 1, wherein the insertion opening is a first pre-formed opening, and the ball valve element includes a second pre-formed opening which communicates with the bore, and which is non-rectilinearly aligned with the first pre-formed opening.

6. A method as claimed in claim 1, further comprising a step (d) subsequent to step (b) of forming a second fluid opening in the ball valve element which communicates with the bore and which is non-rectilinearly aligned with the insertion opening.

7. A method as claimed in claim 6, wherein the second fluid opening is defined by a plurality of second apertures.

8. A method as claimed in claim 7, wherein the second apertures are circular and/or non-circular.

9. A method as claimed in claim 1, wherein the impedance element is plate shaped, and the said insertion opening includes a slot in which the impedance element is slidably receivable.

10. A method as claimed in claim 1, wherein the impedance element is formed from a plurality of plates stacked vertically or horizontally.

11. A method as claimed in claim 1, wherein the impedance element extends across the lateral extent of the bore.

12. A method as claimed in claim 1, wherein the impedance element only partially extends across the lateral extent of the bore.

13. A method as claimed in claim 1, wherein the impedance element fully obstructs the bore.

14. A method as claimed in claim 1, wherein the impedance element only partially obstructs the bore.

15. A method as claimed in claim 1, wherein steps (a), (b) and (c) are performed in an order of (a), (b), (c) or (b), (a), (c).

16. A ball valve element formed using a method as claimed in claim 1.

17. A rotary ball valve assembly comprising a ball valve element formed using a method as claimed in claim 1.

* * * * *

UNITED STATES PATENT AND TRADEMARK OFFICE
CERTIFICATE OF CORRECTION

PATENT NO.         : 7,156,122 B2
APPLICATION NO.    : 11/111708
DATED              : January 2, 2007
INVENTOR(S)        : Christenson et al.

It is certified that error appears in the above-identified patent and that said Letters Patent is hereby corrected as shown below:

On the Title page item (75) Inventors, "Jamee" should read --James--.

Signed and Sealed this

Sixth Day of March, 2007

JON W. DUDAS
*Director of the United States Patent and Trademark Office*